(12) United States Patent
Carlsson

(10) Patent No.: US 9,285,193 B2
(45) Date of Patent: Mar. 15, 2016

(54) VEHICLE SEAT

(75) Inventor: Martin Carlsson, Arnäsvall (SE)

(73) Assignee: BAE SYSTEMS HÄGGLUNDS AKTIENBOLAG, Örnsköldsvik (SE)

( * ) Notice: Subject to any disclaimer, the term of this patent is extended or adjusted under 35 U.S.C. 154(b) by 27 days.

(21) Appl. No.: 14/240,610

(22) PCT Filed: Sep. 13, 2012

(86) PCT No.: PCT/SE2012/050969
§ 371 (c)(1),
(2), (4) Date: Feb. 24, 2014

(87) PCT Pub. No.: WO2013/039448
PCT Pub. Date: Mar. 21, 2013

(65) Prior Publication Data
US 2014/0225406 A1    Aug. 14, 2014

(30) Foreign Application Priority Data
Sep. 16, 2011  (SE) ...................................... 1150841

(51) Int. Cl.
*B60N 2/427* (2006.01)
*F41H 7/04* (2006.01)
(Continued)

(52) U.S. Cl.
CPC *F41H 7/046* (2013.01); *B60N 2/24* (2013.01); *B60N 2/3047* (2013.01); *B60N 2/427* (2013.01); *B60N 2/4242* (2013.01); *B60R 22/18* (2013.01);
(Continued)

(58) Field of Classification Search
CPC ........... B60N 2/42754; B60N 2/42781; B60N 2/4242
USPC .......................... 297/216.1, 216.17; 296/68.1
See application file for complete search history.

(56) References Cited

U.S. PATENT DOCUMENTS 4,257,626 A    3/1981  Adomeit
5,676,336 A  * 10/1997  Nefy et al. ............... 297/216.17
(Continued)

FOREIGN PATENT DOCUMENTS

| DE | 32 32 889  | 3/1984 |
| DE | 3232889 A1 | 3/1984 |
| DE | 4300801 A1 | 7/1994 |

OTHER PUBLICATIONS

International Written Opinion received for PCT Patent Application No. PCT/SE2012/050969, mailed on Nov. 21, 2012, 6 pages.
(Continued)

*Primary Examiner* — Peter Brown
(74) *Attorney, Agent, or Firm* — Morrison & Foerster LLP

(57) ABSTRACT

The invention relates to a vehicle seat comprising a base portion for attachment in a vehicle; a seat bottom part, with a top side and an underside, which seat bottom part is attached to the base portion; a waist belt, which extends between the seat bottom part's sides. At least one hinge mechanism that is adjustable between a first and a second position is arranged at the base portion. The waist belt is attached to the hinge mechanism, so that the waist belts position in relation to the seat bottom part changes when one on the seat bottom part acting force reaches a predetermined value, which force leads the hinge mechanism from the first to the second position.

10 Claims, 6 Drawing Sheets

(51) Int. Cl.
*B60N 2/24* (2006.01)
*B60N 2/30* (2006.01)
*B60N 2/42* (2006.01)
*B60R 22/26* (2006.01)
*B60R 22/18* (2006.01)
*B60R 22/02* (2006.01)
*B60R 22/00* (2006.01)

(52) U.S. Cl.
CPC ........... *B60R 22/26* (2013.01); *B60R 2022/008* (2013.01); *B60R 2022/027* (2013.01)

(56) References Cited

U.S. PATENT DOCUMENTS

| | | | | |
|---|---|---|---|---|
| 6,152,401 | A * | 11/2000 | Green | 244/118.6 |
| 6,322,140 | B1 * | 11/2001 | Jessup et al. | 297/216.17 |
| 6,585,190 | B2 * | 7/2003 | Mort | 297/216.1 |
| 7,293,818 | B2 * | 11/2007 | Kumpf et al. | 296/68.1 |
| 8,109,568 | B2 * | 2/2012 | Masutani | 297/216.15 |
| 9,033,412 | B2 * | 5/2015 | Reinck | 297/216.17 |
| 2010/0219667 | A1 | 9/2010 | Merrill et al. | |
| 2010/0270836 | A1 * | 10/2010 | Mowry et al. | 297/216.19 |

OTHER PUBLICATIONS

International Preliminary Report on Patentability received for PCT Patent Application No. PCT/SE2012/050969, mailed on Mar. 27, 2014, 8 pages.

Extended European Search Report (includes Supplementary European Search Report and Search Opinion) received for European Patent Application No. 12831031.5, mailed on Feb. 9, 2015, 4 pages.

Written Opinion received for Singapore Patent Application No. 2014004808, mailed on Mar. 5, 2015, 11 pages.

International Search Report received for PCT Patent Application No. PCT/SE2012/050969, mailed on Nov. 21, 2012, 4 pages.

* cited by examiner

VEHICLE SEAT

CROSS REFERENCE TO RELATED APPLICATIONS

This application is a U.S. National Phase patent application of PCT/SE2012/050969, filed on Sep. 13, 2012, which claims priority to Swedish Patent Application No. 1150841-3, filed on Sep. 16, 2011, each of which is hereby incorporated by reference in the present disclosure in its entirety.

TECHNICAL FIELD

The present invention relates to a vehicle seat according to the preamble of claim 1.

TECHNICAL BACKGROUND

Vehicle seats in certain types of vehicles, such as military vehicles, must be designed so that a person sitting in the seat is retained in the seat if the vehicle is exposed to strong jolts due to uneven ground surface or if the vehicle overturns. In addition, the vehicle may be exposed to very strong jolts by an explosive charge, such as a mine, that detonates under the vehicle. When an explosive charge detonates under the vehicle, the person sitting in the seat is exposed for a very large upward directed force, resulting in that the person may hit the vehicles ceiling and become injured. The vehicle can be an off-road vehicle, such as an articulated tracked vehicle which has a front and rear vehicle portion which is controllably interconnected with a controller.

The document US-A1-2010/0219667 discloses a vehicle seat with a pretensioner, which is activated by a downward movement of the seat in the event of an explosion or a strongly downward motion of the vehicle, such as a hard landing of a helicopter. Thus, the entire seat moves down to activate the pretensioner. The pretensioner actuates a shoulder belt, pushing the person down and back in the seat when the belt is stretched. Thereby resulting in a compression of the person's spine.

In certain types of vehicles it is desirable to mount several seats in a limited space, which results in that each seat must be compact and have a low weight. It is also important that the seat does not get in the way inside the vehicle because personnel will go in and out of the vehicle. It is also desirable that the design of the seat is simple and that the construction is reliable, since the seat has a safety function in the vehicle seat.

OBJECTIVE OF THE INVENTION

An object of the present invention is to provide a vehicle seat which protects a person sitting in the seat during a mine explosion under the vehicle.

A further object of the invention is to provide a vehicle seat which has a compact construction.

Another object of the invention is to provide a vehicle seat which has a reliable function.

SUMMARY OF THE INVENTION

The above objects are achieved with the vehicle seat according to claim 1.

The vehicle seat permits that a smaller space, above the head of a person sitting in the seat, is needed. A lower ceiling height in the vehicle offer advantages as for instance lower centre of gravity, weight and lower profile. The downward movement of the person sitting in the seat is used to affect a hinge mechanism, which spans and stretches the belt, which results in a simple and reliable function. The seat bottom part of the vehicle seat and also the link mechanism can be lowered into a position that gives the seat a very compact shape and thereby is not in the way for personnel that will get in and out of the vehicle.

BRIEF DESCRIPTION OF THE DRAWINGS

The invention is described in the following with reference to the accompanying drawings which illustrate embodiments of the invention, in which.

DETAILED DESCRIPTION OF THE DRAWINGS

Figure 1:
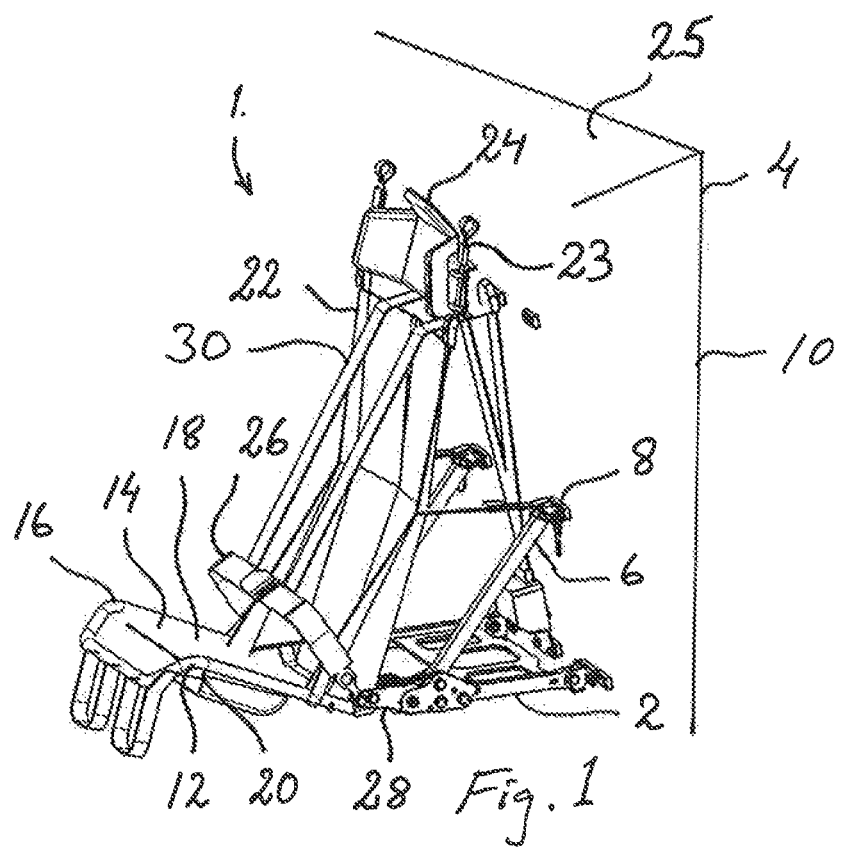
FIG. 1 shows a perspective view of a vehicle seat with a hinge mechanism according to a first embodiment of the present invention.

FIG. 1 shows a vehicle seat 1 according to a first embodiment of the present invention. The vehicle seat 1 comprises a base portion 2 for mounting in a vehicle 4. The base portion 2 is constructed of a framework 6, which with a fastener 8 is attached to a side wall 10 of the vehicle 4. The vehicle 4 can be an off-road vehicle, such as an articulated tracked vehicle which has a front and rear vehicle portion which are controllably interconnected with a controller. A seat bottom part 12 is arranged on the base portion 2. The seat bottom part 12 is articulately attached to the base portion 2. The seat bottom part 12 comprises a resilient support surface 14, which is arranged at and supported by an at least partially around the bearing surface 14 surrounding frame 16. The seat bottom part 12 has a top side 18 and an underside 20. The seat 1 also has a backrest 22 having a neck support 24 which is arranged at the base portion 2. The backrest 22 is supported by load-bearing cords 23 which are attached to the vehicles 4 ceiling 25.

A waist belt 26 extends between the seat bottom part's 12 sides, which waist belt 26 is attached to a hinge mechanism 28 which is arranged on each side of the seat 1. Thus, the waist belt 26 extends between the hinge mechanisms 28. Alternatively, only one hinge mechanism 28 is arranged on one side of the seat 1 and the waist belt 26 is with one end attached to the hinge mechanism 28 and with a second end attached to the base portion 2. It is also apparent from FIG. 1 that a shoulder belt 30 is with a first end attached to the waist belt 26 and with a second end attached to the vehicle 4.

Figure 2:
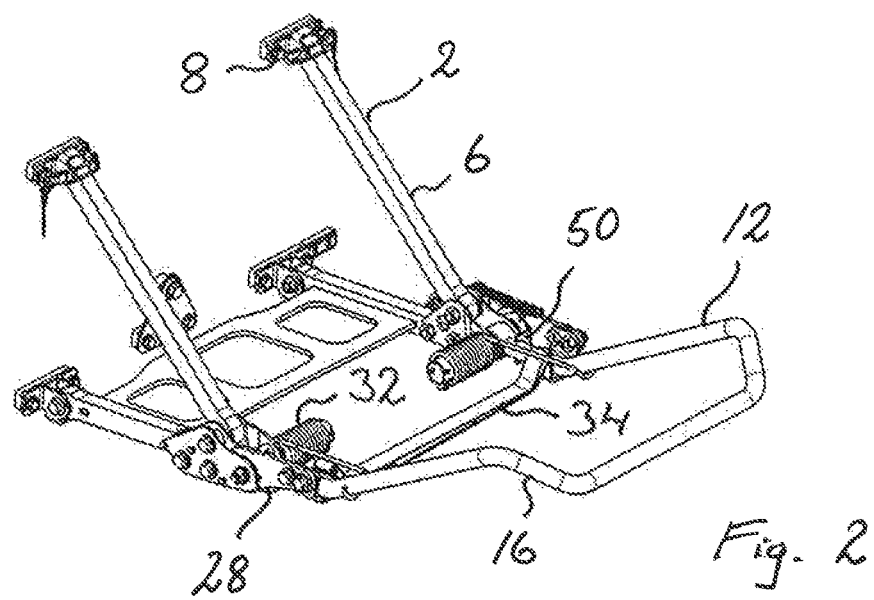
FIG. 2 shows a perspective view in detail of a seat bottom part of a vehicle seat in a lowered position.

As mentioned above, the seat bottom part 12 is articulately attached to the base portion 2. From the FIGS. 2-4 it is apparent how the seat bottom part 12 can be rotated between a lowered position, where the seat bottom part 12 extends substantially horizontally, and a raised position, where the seat bottom part 12 extends substantially vertically. Spring devices 32 at each side of the vehicle seat 1 bias the seat bottom part 12 so that the spring device 32 strives to raise the seat bottom part 12 toward the substantially vertical position. In the lowered position, the seat bottom part's 12 frame 16 is prevented to rotate downward through the load carrying cords 23, which extend through the seat bottom part's 12 frame 16. Thus, the load carrying cords 23 has a length, which is adapted for the seat bottom part 12 to be in a substantially horizontal position when the seat bottom part 12 is in the lowered position. However, there is as mentioned above a resiliency in the seat bottom part's 12 support surface 14. In FIG. 2, the seat bottom part 12 is lowered, in FIG. 3, the seat bottom part 12 is partially raised, and in FIG. 4, the seat bottom part 12 is completely raised.

The hinge mechanism 28 is arranged at the base portion 2 and is, according to the first embodiment, rotatable between a first and a second position. The waist belt 26 is attached to respective hinge mechanism 28 so that the waist belt's 26 position relative to the seat bottom part 12 is changed when one on the seat bottom part 12 acting force reaches a predetermined value, which force rotates the hinge mechanism 28 from the first to the second position. Such a force arises from one in the vehicle seat 1 sitting person and if an explosive charge, such as a land mine, detonates under the vehicle 4.

Figure 3:
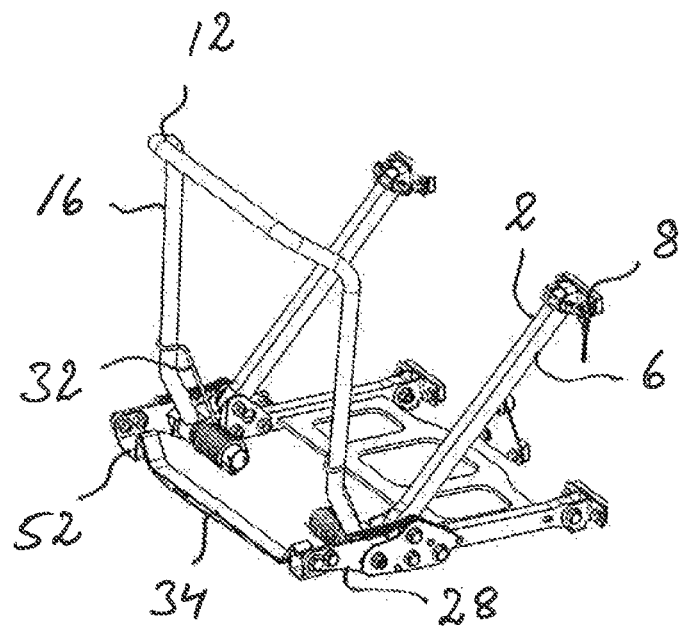
FIG. 3 shows a perspective view in detail of the seat bottom part in a partially raised position.
Figure 4:
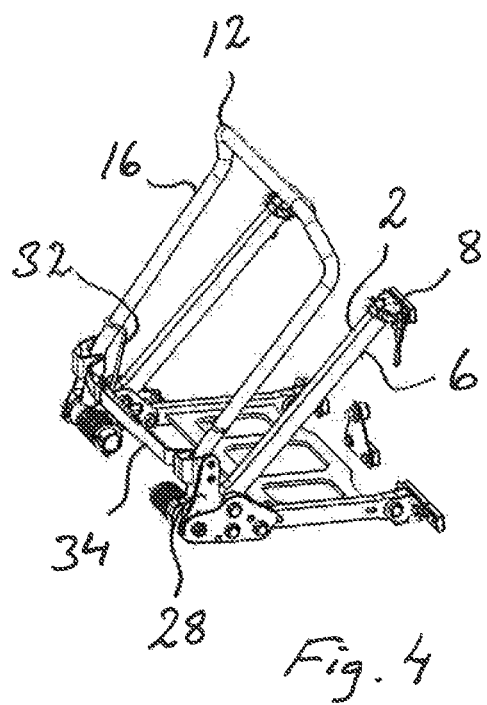
FIG. 4 shows a perspective view in detail of the seat bottom part in a raised position.

It is apparent in FIG. 2-4, that an actuator in the form of a belt 34 extends substantially parallel to the seat bottom part's 12 underside 20. The belt 34 is attached to the respective hinge mechanism 28 and rotates the hinge mechanism 28 to the second position when the predetermined force acting on the seat bottom part 12 is reached. Thus, the vehicle seat 1 will move at high speed upwards if an explosive charge detonates under the vehicle 4. The person sitting in the seat 1 will then of the mass inertia be pushed down in the seat bottom part 12. Since the seat bottom part's 12 support surface 14 is resilient, the person can at the detonation sink into the seat bottom part 12 to thereby, with her or his weight and the force generated, press the belt 34 downward. When the belt 34 is pressed downwardly respective hinge mechanism 28 is rotated downwardly to the second position causing the waist belt 26 also to be pulled downwardly, so that the waist belt 26 is positioned closer to the seat bottom part's 12 top side 18. Thus the waist belt 26 is tightened about the person sitting in the seat bottom part 12. The hinge mechanisms 28 are locked in the second position, which will be described further below. At the springback of the seat bottom part 12, the person gets a high speed and a movement upward, which upward movement is limited by the waist belt 26. The result is that the person is protected from being thrown out of the vehicle seat 1 and is prevented from hitting the vehicle's 4 ceiling 25.

Figure 5:
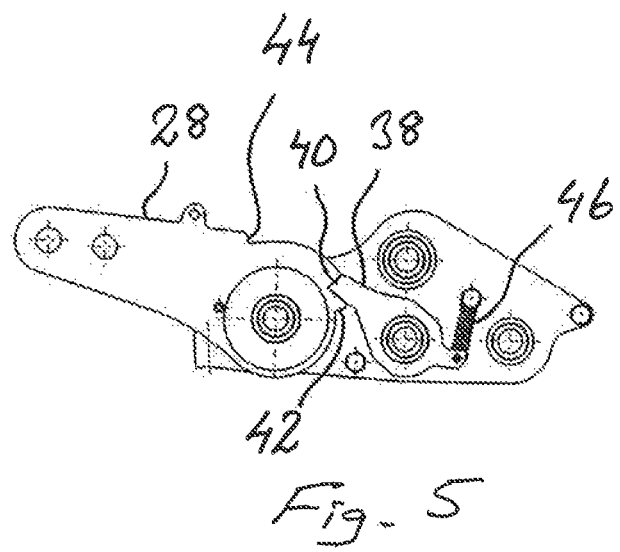
FIG. 5 shows a side view of a hinge mechanism according to the first embodiment in a first position.

The FIGS. 5 to 8 show the hinge mechanism 28 in more detail. In FIG. 5, the hinge mechanism 28 is set in the first position. The hinge mechanism 28 comprises a locking lug 38, which interacts with pawls 40, 42, 44 arranged on the hinge mechanism 28. When the hinge mechanism 28 is in the first position the locking lug 38 engages with a first pawl 40, which prevents the hinge mechanism 28 from being rotated upwardly to a substantially vertical position. The purpose of locking the hinge mechanism 28 in the first position is that the waist belt 26 which is attached to the link mechanism does not follow the seat bottom part 12 upward as the seat bottom part 12 begins to be raised. This prevents the waist belt 26 from beginning to slack, which can be negative when the vehicle 4 is driving in rough terrain when the vehicle 4 inclines and if the vehicle 4 would overturn and end up upside down.

Figure 6:
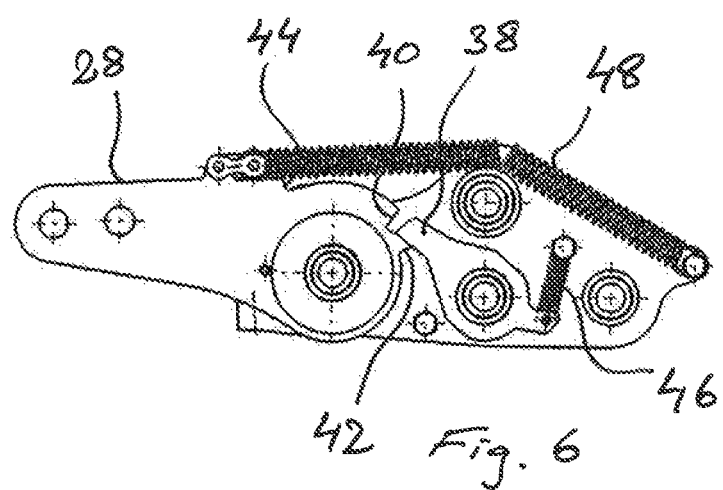
FIG. 6 shows a side view of the hinge mechanism according to the first embodiment in a position between the first and a second position.
Figure 7:
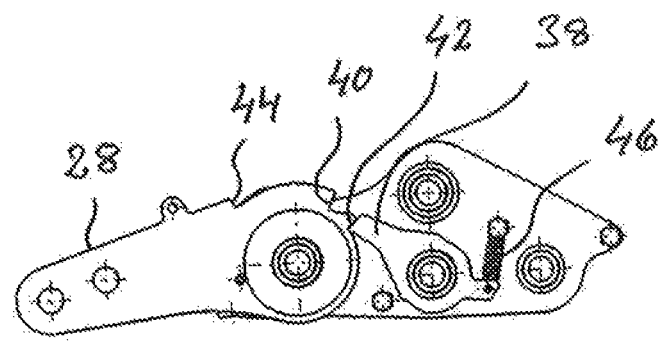
FIG. 7 shows a side view of the hinge mechanism according to the first embodiment in a second position.

If an explosive charge is detonated under the vehicle 4 and the belt 34 thereby is pushed down, as described above, the hinge mechanisms 28 on each side of the seat 1 is rotated down to the second position. When the hinge mechanism 28 is in the second position the locking lug 38 engages with a second pawl 42 arranged in the hinge mechanism 28, which prevents the hinge mechanism 28 from rotating back to the first position. FIG. 6 shows how the hinge mechanism 28 is rotated from the first position and where the locking lug 38 leaves the first pawl 40. The locking lug 38 is articulated and spring loaded by a first tension spring 46. It is also apparent from FIG. 6 that the hinge mechanism 28 is spring loaded by a second tension spring 48 striving to rotate the hinge mechanism 28 toward the first position. FIG. 7 shows the hinge mechanism 28 in the second position and where the locking lug 38 engages the second pawl 42.

Figure 8:
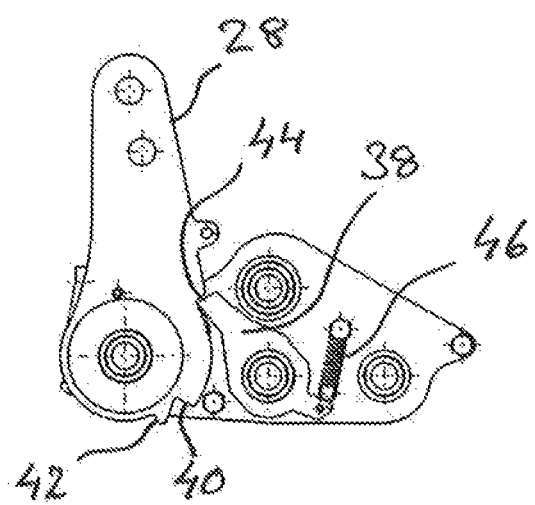
FIG. 8 shows a side view of the hinge mechanism according to the first embodiment in a third position.

When the seat bottom part 12 is raised in the substantially vertical position, it is desirable that also the hinge mechanism 28 is raised upwardly, so that the hinge mechanisms 28 do not protrude from the seat's 1 base portion 2 and thereby prevents personnel within the vehicle 4 to pass the seat 1 and the raised seat bottom part 12. When the seat bottom part 12 is raised upwardly, a release mechanism 50 will affect the locking lug 38, so that it is released and thereby gets out of engagement with the first pawl 40, or, where appropriate, the second pawl 42. Upon release of the locking lug 38, the second tension spring 48 will act to rotate the hinge mechanism 28 to a third position, as shown in FIG. 8. In the third position the locking lug 38 engages with the third pawl 44 of the hinge mechanism 28.

Figure 9:
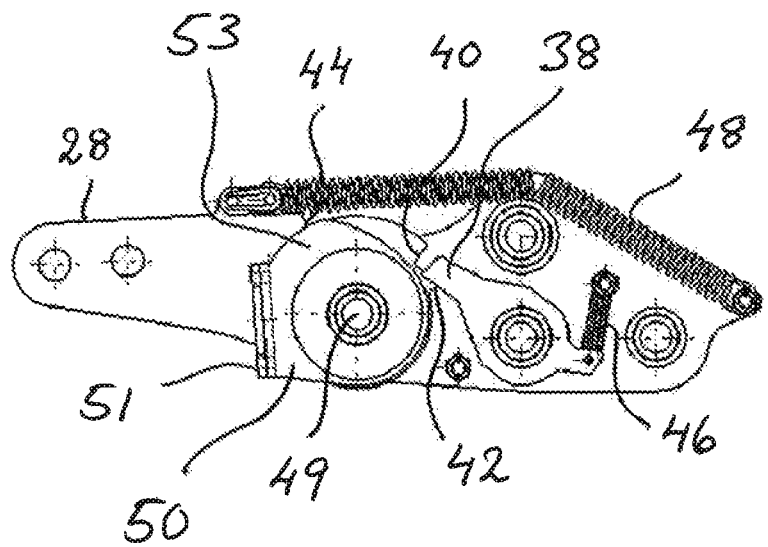
FIG. 9 shows a side view of the hinge mechanism according to the first embodiment in a position between the first and the second position with a release mechanism.
Figure 10:
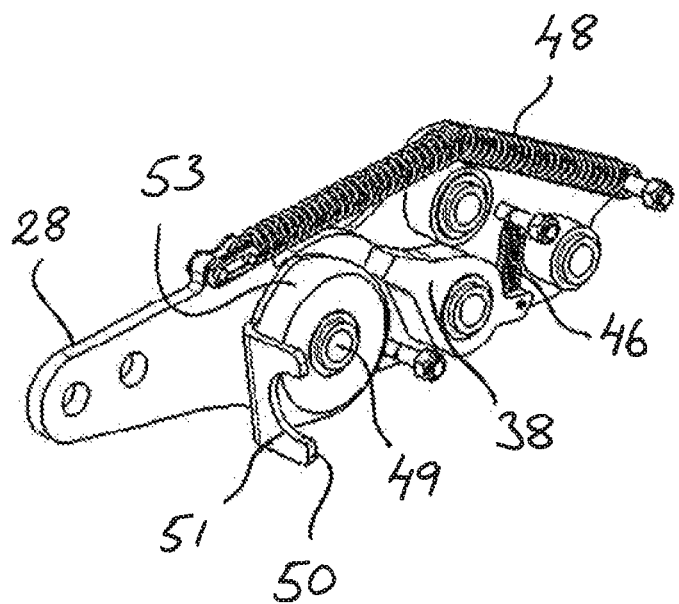
FIG. 10 shows a perspective view of the hinge mechanism according to the first embodiment in a position between the first and the second position with the release mechanism.

In FIGS. 9 and 10, the release mechanism 50 is shown in more detail. FIG. 9 shows a side view of the hinge mechanism 28 according to the first embodiment in a position between the first and the second position in which the release mechanism 50 is journalled on one with the hinge mechanism 28 common shaft 49 and rotatable relative to the hinge mechanism 28. The release mechanism 50 comprises a fork 51, as apparent in FIG. 10, which shows in a perspective view the hinge mechanism 28 and the release mechanism 50. The fork 51 engages the seat bottom part's 12 frame 16, so that the release mechanism 50 follows and is rotated by the seat bottom part 12. The release mechanism 50 comprises a cam 53 which interacts with the locking lug 38. When the release mechanism 50 is rotated, the cam 53 will lift the locking lug 38 out of engagement with the first or second pawl 44 so that the hinge mechanism 28 can be rotated to the third position.

When the seat bottom part 12 is to be rotated from the raised position to the lowered position the seat bottom part 12 interacts with a pull down hook 52, which is arranged at respective hinge mechanism 28. The pull down hook 52 thereby rotates the hinge mechanism 28 to the first position when the seat bottom part 12 is lowered from the raised position to the lowered position.

Figure 11:
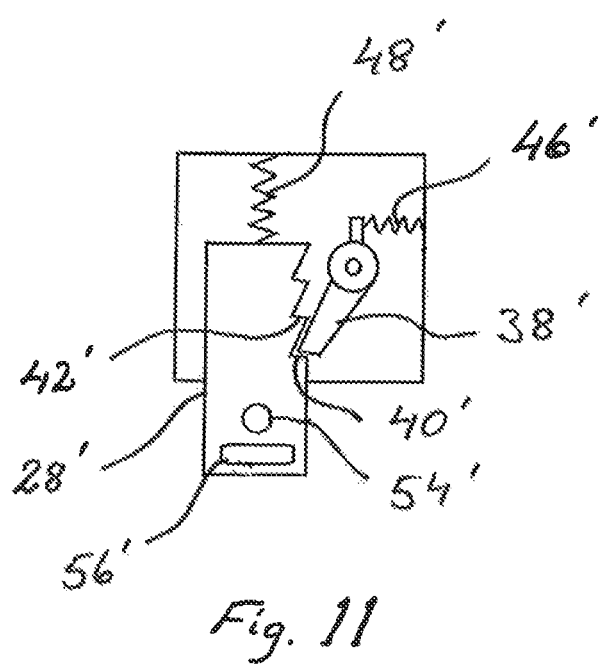
FIG. 11 shows a side view of a hinge mechanism in a first position according to a second embodiment of the invention.

FIG. 11 shows a second embodiment of the invention. According to this second embodiment, the hinge mechanism 28' is substantially linearly displaceable between the first and second position. In the first position a locking lug 38' engages with a first pawl 40' of the hinge mechanism 28'. If an explosive charge is detonated under the vehicle 4 and the belt 34 over the seat bottom part 12 thereby is pushed down, as described above in connection with the first embodiment, the hinge mechanisms 28' are displaced on each side of the seat 1 downward to a second position. When the hinge mechanism 28' is in the second position the locking lug 38' engages with a second pawl 42' arranged in the hinge mechanism 28', which prevents the hinge mechanism 28' from being moved back to the first position. The locking lug 38' is rotatable and spring loaded by a first tension spring 46'. It is also apparent that the hinge mechanism 28' is spring loaded by a second tension spring 48' which strives to displace the hinge mechanism 28' toward the first position. The hinge mechanism 28' has a hole 54' for attachment of the waist belt 26 and a slot 56' for attachment of the belt 34.

The hinge mechanism 28, 28' is in this context relating to a mechanism adjustable between a first and a second position. The hinge mechanism 28' can also be described as, in the second embodiment, substantially linearly displaceable between the first and second position.

The described embodiments can be combined together and be used simultaneously on one and the same vehicle seat.

The invention claimed is:

1. Vehicle seat comprising:
   a base portion for attachment in a vehicle;
   a seat bottom part, with a top side and an underside, which seat bottom part is attached to the base portion, wherein the top side of the seat bottom part comprises a resilient support surface, which is arranged at and supported by an at least partially around a support surface surrounding frame;
   a waist belt extending between the seat bottom part's sides, and
   at least one hinge mechanism, that is adjustable between a first position and a second position, arranged at the base portion,
   wherein the waist belt is attached to the hinge mechanism,
   an actuator extends substantially parallel with the seat bottom part's underside and is attached to the at least one hinge mechanism, so that the actuator moves the hinge mechanism from the first position to the second position, and
   a position of the waist belt in relation to the seat bottom part changes when a force acting on the seat bottom part reaches a predetermined value so as to make the actuator move the hinge mechanism from the first position to the second position, the force being a downwards acting force generated by mass inertia of a person sitting in the seat when the seat moves at a high speed upwards.

2. Seat according to claim 1, characterized in that the actuator is a belt, extending along the seat bottom part's underside and configured to receive the force of the predetermined value.

3. Seat according to claim 1, characterized in that the hinge mechanism comprises a locking lug which interacts with pawls arranged on the hinge mechanism, such that the locking lug engages with a first pawl when the hinge mechanism is in the first position and that the locking lug engages a second pawl when the hinge mechanism is lead to the second position.

4. Seat according to claim 3, characterized in that the seat bottom part is hingeably attached to the base portion, so that the seat bottom part can be raised to a substantially vertical position in which the locking lug engages with a third pawl on the hinge mechanism.

5. Seat according to claim 4, characterized in that a pull down hook is arranged at the at least one hinge mechanism, which pull down hook interacts with the seat bottom part, so that the pull down hook rotates the hinge mechanism to the first position when the seat bottom part is lowered from the substantially vertical position to a substantially horizontal position.

6. Seat according to claim 1, characterized in that the hinge mechanism is rotatable between the first and the second position.

7. Seat according to any of claim 1, characterized in that the hinge mechanism is substantially linearly displaceable between the first and second position.

8. Seat according to claim 1, characterized in that a hinge mechanism is arranged on each side of the seat and that the waist belt is extending between the hinge mechanisms.

9. Seat according to claim 1, characterized in that a backrest is arranged at the base portion, which backrest is supported by cords attached to the vehicle.

10. Seat according to claim 1, characterized in that a shoulder belt is at a first end attached to the waist belt and with a second end attached to the vehicle.

\* \* \* \* \*